H. D. FARQUHAR.
MULTIPLYING ATTACHMENT FOR CAMERAS.
APPLICATION FILED MAR. 29, 1913.

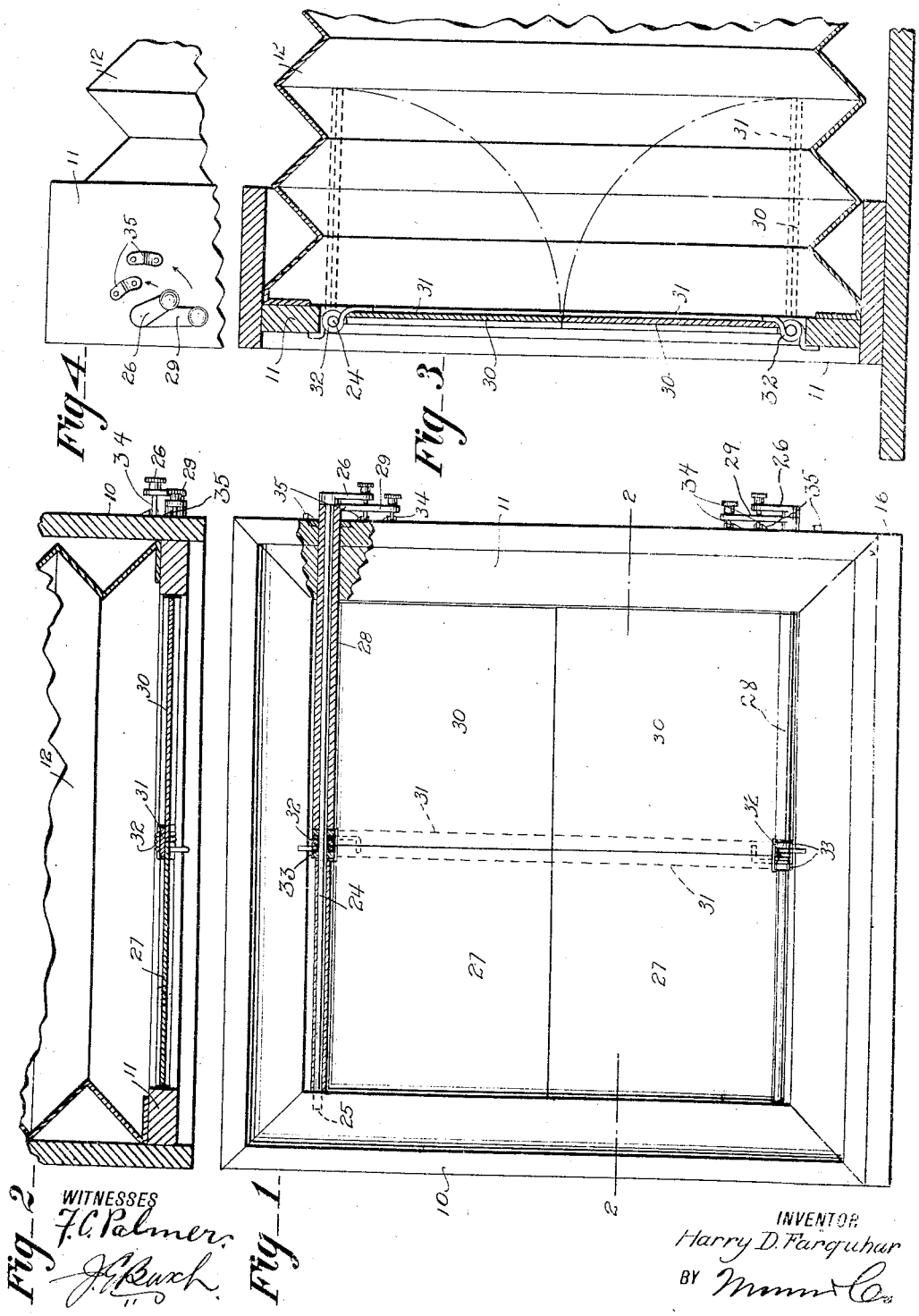

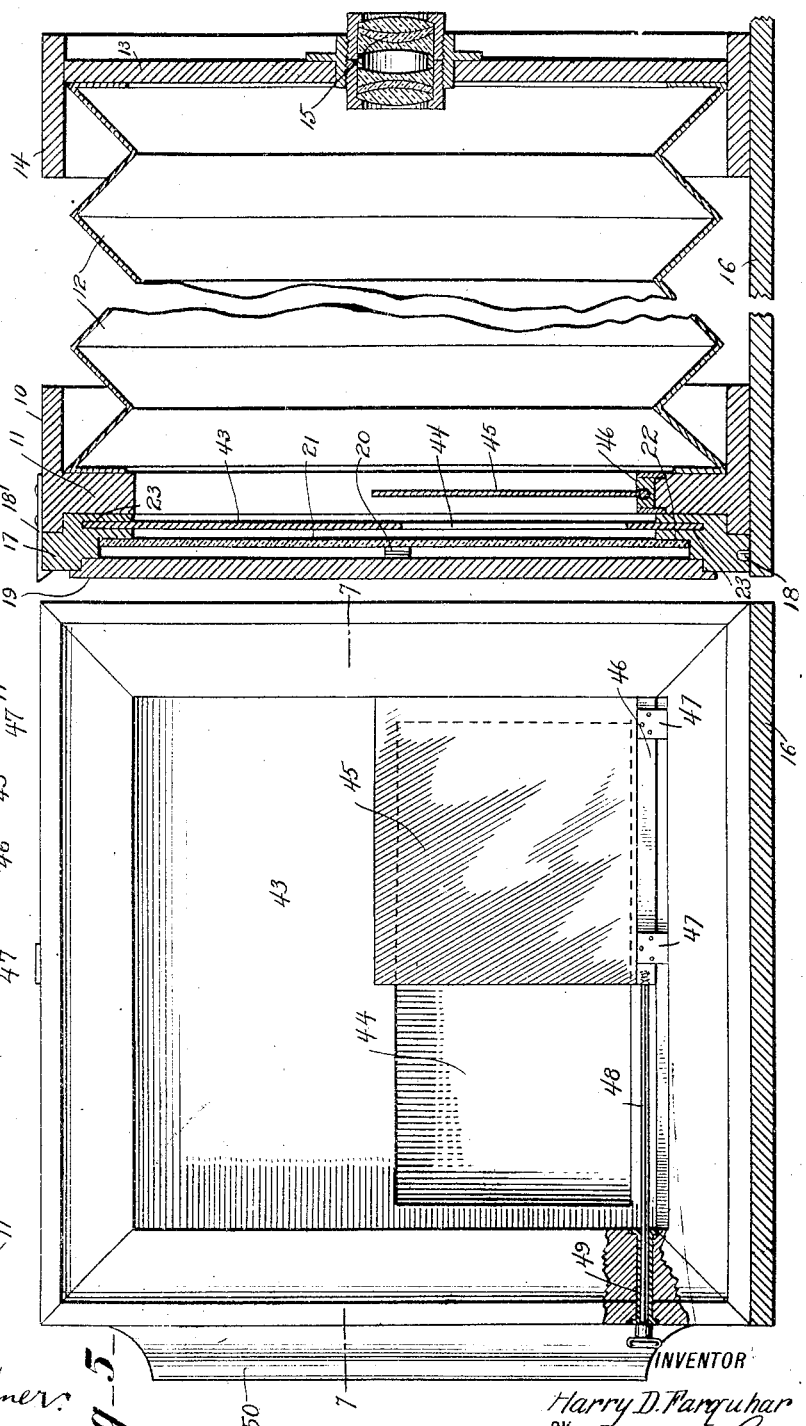

Patented July 14, 1914.
3 SHEETS—SHEET 3.

WITNESSES
Frank C. Palmer
J. R. Burch

INVENTOR
Harry D. Farquhar
BY Munn & Co
ATTORNEYS

UNITED STATES PATENT OFFICE.

HARRY D. FARQUHAR, OF NEW YORK, N. Y.

MULTIPLYING ATTACHMENT FOR CAMERAS.

1,103,745.  Specification of Letters Patent.  Patented July 14, 1914.

Application filed March 29, 1913. Serial No. 757,541.

*To all whom it may concern:*

Be it known that I, HARRY D. FARQUHAR, a citizen of the United States, and a resident of the city of New York, borough of Brooklyn, in the county of Kings and State of New York, have invented a new and Improved Multiplying Attachment for Cameras, of which the following is a full, clear, and exact description.
This invention has special reference to the class of photography and more particularly to improved multiplying attachments for cameras.

The essential object of the invention resides in the production of a multiplying attachment for cameras especially adapted for commercial use and which produces a new multiple system of photographing by permitting one or a plurality of exposures on one plate with a single lens and a single camera and one plate holder.

More particularly, the invention resides in the novel arrangement of swinging or sliding plates in the form of shutters, for exposing to view different sections of the plate, and means for operating said plates whereby one, two, three or four exposures from a single lens and a single camera may be produced in coöperation with the ordinary supporting stand for the objects to be photographed, it being understood that said objects will be disposed in such relative positions as to conform to the relation of the portions of the camera through which light may be admitted.

With the above and other objects in view, the invention resides more particularly in the peculiar combinations and arrangements of parts which will be illustrated as a preferred embodiment in the accompanying drawings and described in the specification.

Reference is to be had to the accompanying drawings forming a part of this specification, in which like characters of reference indicate corresponding parts in all the views, and in which—

Figure 9:
Figure 8:
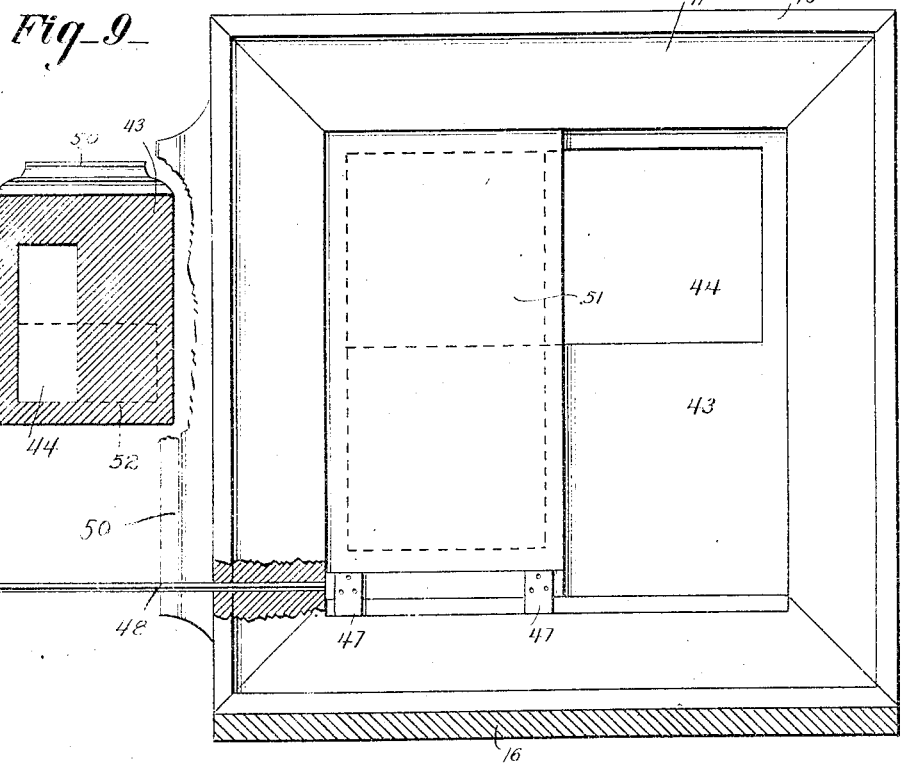
Figure 10:
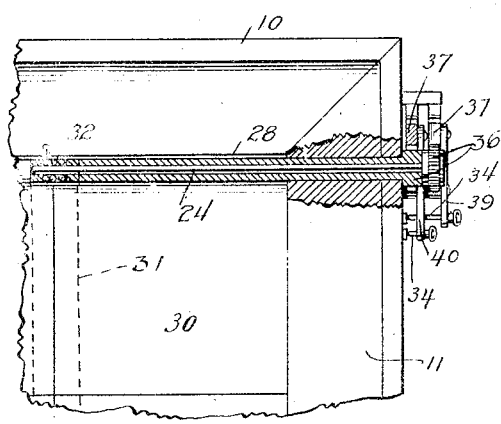
Figure 11:
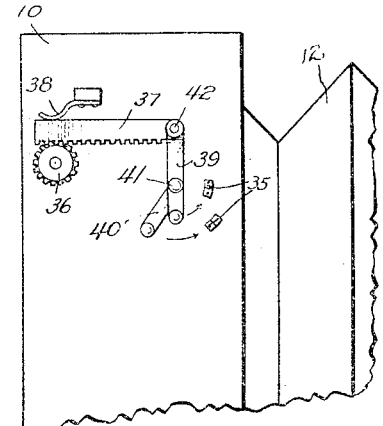

Figure 1 is a rear elevation of a camera having the preferred form of my improved multiplying attachment applied thereto, certain of the parts being shown in section; Fig. 2 is a horizontal sectional view taken on the line 2—2 of Fig. 1; Fig. 3 is a vertical longitudinal sectional view of a fragmentary portion of the camera, the swinging shutter forming plates being illustrated in dotted lines as when in open position; Fig. 4 is a side elevation of a fragmentary portion of the camera to more particularly illustrate the operating levers for swinging the plates; Fig. 5 is a rear elevation of a camera with a modified form of multiplying attachment, a fragmentary portion of the box or frame of the camera being broken away to show the mounting of the operating member for a sliding plate forming the attachment in conjunction with a light excluding slide; Fig. 6 is a vertical longitudinal sectional view of the camera employing the form of attachment shown in Fig. 5, the intermediate portion of the camera being broken away; Fig. 7 is a horizontal sectional view on the line 7—7 in Fig. 5; Fig. 8 is a view similar to Fig. 5 but showing a modified form of attachment, the plate being in an oppositely shifted position; Fig. 9 is a face view of a light excluding slide adapted for coöperation with the forms of the attachment shown in Figs. 5 and 8; Fig. 10 is a fragmentary portion of a camera embodying the form of the invention shown in Fig. 1 but with a modified form of operating mechanism for the swinging sections or plates; and Fig. 11 is a side elevation of the form of the invention shown in Fig. 10.

In the drawings the numeral 10 designates the frame or box of an ordinary commercial or photo-view camera, the same having an internal bead or shoulder 11 to which the usual bellows 12 is attached at the back of the camera, said bellows being also attached to the front wall 13 of the camera front or frame section 14 in the usual manner. The front wall 13 carries a single lens 15 which is of a type to permit general instantaneous and copying work, whereby when the back section 10 is adjusted along the base 16, the proper focus may be obtained to produce a sharp image.

A plate or negative holder 17 in the form of a frame is carried at the back portion of the camera, being held as by means of a pin 18 and a clip 18'. This holder carries the usual closure or hinged door 19 provided with a spring 20 for holding the plate 21 in position and against movement in contact with a shoulder 22 produced by rabbeted portions of the holder frame. The holder inwardly of the sensitive plate 21 is provided with upper and lower grooves 23 in which is received the ordinary dark or light-excluding slide.

In the preferred form of the invention the holder is as above described, and in addition thereto the bead or shoulder 11 beneath its top portion and above its bottom portion carries a pivot rod or shaft 24, journaled at one end in the bead as shown at 25, and passed through the back part and bead at the opposite side, at which end the shaft carries an operating lever 26. Fixed to each of the rods 24 is a plate or section 27, each occupying one-quarter of the space or opening produced by the bead and being preferably of light sheet metal, for instance, aluminium, and adapted to exclude the light from the sensitive plate in its holder.

Mounted on each of the rods 24 is a hollow shaft or tube 28, the same being adapted for independent turning or oscillation on the rods or shafts 24 and simultaneously extending through one side of the back section of the camera frame. Each hollow shaft or tube carries a lever 29 and thus the shafts or tubes may be alternately operated to open or close either one of the sections 27 carried by the rods or shafts 24 or either one of the sections 30 carried by the hollow shafts or tubes 28. In this manner one-quarter, one-half, three-quarters or all of the opening may be uncovered to admit light, and by disposing the objects to be photographed in the proper relation from one to four exposures may be made on a single plate with a single lens and a single camera.

The sections 27 and 30 are shown in open position in Fig. 3 of the drawings, as indicated in dotted lines, but these sections are normally held in closed position, and the joints formed at their co-acting edges are covered to exclude light by means of strips 31 which terminate at the inner corners of the sections and which at their outer ends are pivoted to the shafts or rods 24, preferably in contact with the inner extremities of the hollow shafts or tubes 28. Means are provided to normally hold these strips 31 against the inner faces of the sections to similarly hold the latter in closed position, such means consisting of coiled springs 32 engaged on the pivot rods or shafts 24 between the ears 33 of the strips, said springs having their opposite extremities engaging with the outer faces of the bead or shoulder 11 and the inner faces of the strips, respectively. In order to hold the sections in their open positions when independently operated as above described, the levers 26 and 29 are provided with gripping portions having spring pins or fingers 34 which, when the levers are swung in position to open the sections, will engage with and behind the shoulders or angular catches 35 secured to the back section 10 of the camera frame and preferably to the outside of the latter.

As a modified form of operating means for the shutter sections or plates 27 and 30, with the parts constructed as described, as shown in Figs. 10 and 11 of the drawings the shafts 24 and 28 carry pinions 36 which are engageable by rack bars 37 held in contact therewith by springs 38 supported from the frame part 10 and bearing on the rack bars. Levers 39 and 40 are pivoted as shown at 41 on one side of the section 10 of the frame, and these levers are in turn pivotally connected as shown at 42 independently to the rack bars 37, whereby the shafts 24 and 28 may be independently turned or oscillated through the respective intermeshed pinions 36 carried by the said shafts. The levers 39 and 40 are engageable with the catches 35 in the usual manner. This form of operating mechanism is adapted in view of the distant positions of the operating levers with respect to the shafts, primarily for cameras wherein the operating mechanism shown in Figs. 1, 2 and 3 could not be used at all or could not be used with convenience.

In the form of the invention shown in Figs. 5, 6 and 7 of the drawings, I provide in lieu of the ordinary dark slide, a slide or plate 43 having a longitudinal or otherwise positioned opening 44 exposing substantially one-half of the negative or printing plate, the same being fitted in the grooves 23 in the ordinary manner. Co-operating with the plate 43 is a slide or plate 45 which is of the same size as one of the sections 27 or 30 heretofore described, and which thus covers one-quarter of the area of the opening in the frame or back section 10. This slide or plate is mounted upon a grooved support 46 which is supported on the bottom portion of the bead 11 and which is provided at its opposite sides with depending straps 47 serving to hold it from displacement when longitudinally shifted through the instrumentality of an operating rod 48 detachably connected to the support and passed directly through one side of the section 10 or through a tubular guide 49 carried thereby, and having a gripping portion by which it may be manipulated. In this form of the device the parts may be disposed in the position shown in Fig. 5 so that the lower left hand quarter of the opening is uncovered, or by shifting the slide to the left the lower right hand quarter of the opening may be uncovered, and by reversing the dark slide 43 to dispose the opening 44 uppermost the upper half of the opening may be uncovered, and in addition to this, should the slide 43 be removed three-quarters of the opening will be uncovered, depending upon the position of the slide 45 as to which lower quarter is uncovered. Both of the slides may also be readily removed, as is apparent, to uncover all of the opening.

In the form of the invention shown in Figs. 8 and 9 of the drawings, the slide 43 has the opening 44 and this slide may be reversed in position through the medium of the usual grasping portion 50, but in lieu of the slide 45 I provide a slide 51 which is mounted in the same manner but which extends throughout the height of the opening so as to expose either upper quarter of the opening in connection with the opening 44 in the slide 43 by shifting said slide 51 from one side to the other. The dotted lines 52 in Fig. 9 of the drawings illustrate in diagrammatic form the relative positions of the slide 51, and it will be further obvious that by reversing the slide 43 either lower quarter of the opening may be uncovered, and also that by removing the slide 43 either vertical half of the opening may be uncovered, according to which side the slide 51 is shifted.

From the foregoing description in connection with the accompanying drawings, it will be seen that my improved multiplying attachment for cameras not only results in a multiple system of photographing in a novel way, but provides a structure which in each instance will allow rapid exposures for copying work, and more essentially, from one to four exposures upon a single plate with a camera having a single lens.

Having thus described my invention, what I claim as new and desire to secure by Letters Patent is:—

1. A multiplying attachment for cameras embodying a plurality of plate sections mounted in the frame of the camera remote from the lens, means for shifting certain of said plate sections from one side of the exterior of the frame, said means telescoping one with relation to the other, and sleeves through which said shifting means operate.

2. A multiplying attachment for cameras embodying plate sections mounted in the frame of the camera remote from the lens, and hand-operated means at one side of the frame for shifting certain of said sections independently of the other sections to uncover independent quarter portions of the opening through the frame, said means extending through said side of the frame in interfitting engagement.

3. The combination with a camera including a base, a front section carrying a single lens, a back section movable on the base and a bellows connecting said sections; of an internal bead at the back of the frame producing an opening, a plurality of hinged plates coöperating to close the opening formed in the back portion of the frame by said bead, and interfitting means connected to the pivots of the plates and located at one side of the back section of the camera for shifting the plates.

4. The combination with a camera including a base, a front section carrying a single lens, a back section movable on the base and a bellows connecting said sections; of a plurality of hinged plates coöperating to close the back portion of the frame, pivots for the plates fitting on each other, means connected to the pivots of the plates and located at one side of the back section of the camera for independently shifting the plates, handles for turning the pivots, and means carried by the back section and coöperating with the handles for holding said plates in adjusted positions.

5. The combination with a camera including a base, a front section carrying a single lens, a back section movable on the base and a bellows connecting said sections; of a plurality of slidable plates coöperating to partially close the back section of the frame and allow openings in the remaining portions, and a grasping member operating through the frame and connected to certain of said plates for shifting the same, certain plates being removable and reversible to vary the sizes and shapes of the openings.

6. A multiplying attachment for cameras embodying plate sections mounted in the frame of the camera remote from the lens, means for swinging said plate sections independently movable spring-actuated strips for closing the spaces between the plate sections to form light-excluding joints.

7. The combination with a camera having a frame at its back portion; of shafts journaled in the frame horizontally near the top and bottom edge portions of its opening, said shafts projecting through the frame at one side, tubular shafts mounted on said first-mentioned shafts and also extending through the frame, said tubular shafts terminating near the center of the opening, four plates fixed to the portions of the first-mentioned shafts beyond the tubular shafts and to the tubular shafts respectively to rotate therewith, and handles at the ends of the shafts for independently turning the same to move the plates to open or closed positions.

8. The combination with a camera having a frame at its back portion; of shafts journaled in the frame horizontally near the top and bottom edge portions of its opening, said shafts projecting through the frame at one side, tubular shafts mounted on said first-mentioned shafts and also extending through the frame, said tubular shafts terminating near the center of the opening, four plates fixed to the portions of the first-mentioned shafts beyond the tubular shafts and to the tubular shafts respectively to rotate therewith, handles at the ends of the shafts for independently turning the same to move the plates to open or closed positions, means for limiting the movements of the plates in either direction, and strips mounted on the shafts first mentioned and normally held to overlie the co-acting edge portions of the plates.

In testimony whereof I have signed my name to this specification in the presence of two subscribing witnesses.

HARRY D. FARQUHAR.

Witnesses:
 JOHN C. BURCH,
 PHILIP D. ROLLHAUS.